United States Patent
Goswami et al.

(10) Patent No.: US 11,159,965 B2
(45) Date of Patent: Oct. 26, 2021

(54) QUALITY OF EXPERIENCE MEASUREMENTS FOR CONTROL OF WI-FI NETWORKS

(71) Applicant: Plume Design, Inc., Palo Alto, CA (US)

(72) Inventors: Kunal Goswami, Palo Alto, CA (US); William McFarland, Portola Valley, CA (US); Manikanden Balakrishnan, San Mateo, CA (US); Adam Hotchkiss, Burlingame, CA (US)

(73) Assignee: Plume Design, Inc., Palo Alto, CA (US)

( * ) Notice: Subject to any disclaimer, the term of this patent is extended or adjusted under 35 U.S.C. 154(b) by 82 days.

(21) Appl. No.: 16/678,362

(22) Filed: Nov. 8, 2019

(65) Prior Publication Data
US 2021/0144567 A1    May 13, 2021

(51) Int. Cl.
| | | |
|---|---|---|
| *H04W 24/08* | (2009.01) | |
| *H04L 12/24* | (2006.01) | |
| *H04W 24/02* | (2009.01) | |
| *H04W 24/04* | (2009.01) | |
| *H04W 24/10* | (2009.01) | |
| *H04W 84/12* | (2009.01) | |

(52) U.S. Cl.
CPC ......... *H04W 24/08* (2013.01); *H04L 41/0654* (2013.01); *H04L 41/5067* (2013.01); *H04W 24/02* (2013.01); *H04W 24/04* (2013.01); *H04W 24/10* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 10,122,829 | B2 * | 11/2018 | Saavedra | H04L 12/2863 |
| 10,164,850 | B2 * | 12/2018 | Tapia | H04L 41/5087 |
| 10,341,193 | B2 | 7/2019 | Rengarajan et al. | |
| 10,425,849 | B1 * | 9/2019 | Joul | H04L 43/045 |
| 10,602,388 | B1 * | 3/2020 | Rengarajan | H04W 24/10 |
| 10,687,227 | B2 * | 6/2020 | Rusackas | H04L 41/22 |
| 10,779,183 | B2 * | 9/2020 | Li | H04W 24/08 |
| 10,785,675 | B2 * | 9/2020 | Lee | H04W 28/02 |

(Continued)

FOREIGN PATENT DOCUMENTS

WO    2014093910 A2    6/2014

OTHER PUBLICATIONS

Feb. 12, 2021, International Search Report and Written Opinion for International Patent Application No. PCT/US2020/059654.

*Primary Examiner* — Tri H Phan
(74) *Attorney, Agent, or Firm* — Clements Bernard Baratta; Lawrence A. Baratta, Jr.

(57) ABSTRACT

Systems and methods include obtaining operational data for a Wi-Fi network including one or more access points providing wireless connectivity to one another and to one or more Wi-Fi client devices; determining a Quality of Experience (QoE) measurement from the operational data for each of the one or more access points and the one or more Wi-Fi client devices; and providing a display of associated QoE measurements for the one or more access points and the one or more Wi-Fi client devices. The systems and methods can include providing the display in real-time or near real-time to troubleshoot or debug operations of the Wi-Fi network.

20 Claims, 7 Drawing Sheets

(56) References Cited

U.S. PATENT DOCUMENTS

| | | |
|---|---|---|
| 10,887,197 B2 * | 1/2021 | Fenoglio ................. H04L 43/08 |
| 10,924,825 B2 * | 2/2021 | Das ....................... H04J 3/1652 |
| 10,992,548 B2 * | 4/2021 | Sridhar ............... H04L 41/5038 |
| 2012/0027093 A1 | 2/2012 | Amon et al. |
| 2012/0327779 A1 | 12/2012 | Gell et al. |
| 2014/0094159 A1 | 4/2014 | Raleigh et al. |
| 2014/0219088 A1 | 8/2014 | Oyman et al. |
| 2014/0226658 A1 | 8/2014 | Kakadia et al. |
| 2014/0328190 A1 | 11/2014 | Lord et al. |
| 2019/0116504 A1 | 4/2019 | Rusackas et al. |

\* cited by examiner

QUALITY OF EXPERIENCE MEASUREMENTS FOR CONTROL OF WI-FI NETWORKS

FIELD OF THE DISCLOSURE

The present disclosure generally relates to wireless networking systems and methods. More particularly, the present disclosure relates to systems and methods for Quality of Experience (QoE) measurements for control of Wi-Fi networks.

BACKGROUND OF THE DISCLOSURE

Wi-Fi networks (i.e., Wireless Local Area Networks (WLAN) based on the IEEE 802.11 standards) are ubiquitous. In fact, Wi-Fi is the most common technique for user device connectivity, and the applications that use run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly-assigned U.S. patent application Ser. No. 16/032,584, filed Jul. 11, 2018, and entitled "Optimization of distributed Wi-Fi networks," the contents of which are incorporated by reference herein.

An important aspect of any optimization is having a measurement to act upon. There exist various different Quality of Service (QoS) and Quality of Experience (QoE) measurements. The critical aspect is to get a measurement that is accurate, real-time, and readily available. That is, the various conventional measurements do not track well with the end user experience, are available on a historical basis, and require computation or inferences. Of course, measurements that do not track well are not useful in optimization, non-real-time data does not fix the problems as they happen, etc.

BRIEF SUMMARY OF THE DISCLOSURE

In an embodiment, a non-transitory computer-readable medium includes instructions that, when executed, cause a processor to perform the steps of obtaining operational data for a Wi-Fi network including one or more access points providing wireless connectivity to one another and to one or more Wi-Fi client devices; determining a Quality of Experience (QoE) measurement from the operational data for each of the one or more access points and the one or more Wi-Fi client devices; and providing a display of associated QoE measurements for the one or more access points and the one or more Wi-Fi client devices.

In another embodiment, an apparatus includes a processor; and memory storing instructions that, when executed, cause the processor to obtain operational data for a Wi-Fi network including one or more access points providing wireless connectivity to one another and to one or more Wi-Fi client devices; determine a Quality of Experience (QoE) measurement from the operational data for each of the one or more access points and the one or more Wi-Fi client devices; and provide a display of associated QoE measurements for the one or more access points and the one or more Wi-Fi client devices.

In a further embodiment, a method includes obtaining operational data for a Wi-Fi network including one or more access points providing wireless connectivity to one another and to one or more Wi-Fi client devices; determining a Quality of Experience (QoE) measurement from the operational data for each of the one or more access points and the one or more Wi-Fi client devices; and providing a display of associated QoE measurements for the one or more access points and the one or more Wi-Fi client devices.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for Quality of Experience (QoE) measurements for control of Wi-Fi networks. The present disclosure includes a QoE measurement based on possible throughput a device could get, a QoE measurement based on a "happy" throughput indicative of what the device needs, and a QoE measurement based on a ratio of these values. Advantageously, these measurements are accurate for use in optimization and adjustment of the Wi-Fi network. These measurements are real-time or close, allowing the optimization to resolve issues currently affecting users. Further, these measurements are derived from statistics readily available with Wi-Fi chipsets. The approach described herein predicts the throughput a device could get for comparison to the throughput the device needs. The QoE measurements can be used for troubleshooting by a network operator, such as from a Network Operations Center (NOC), and to identify network reconfigurations (e.g., adding access points, moving access points, etc.).

Wi-Fi System

Figure 1:
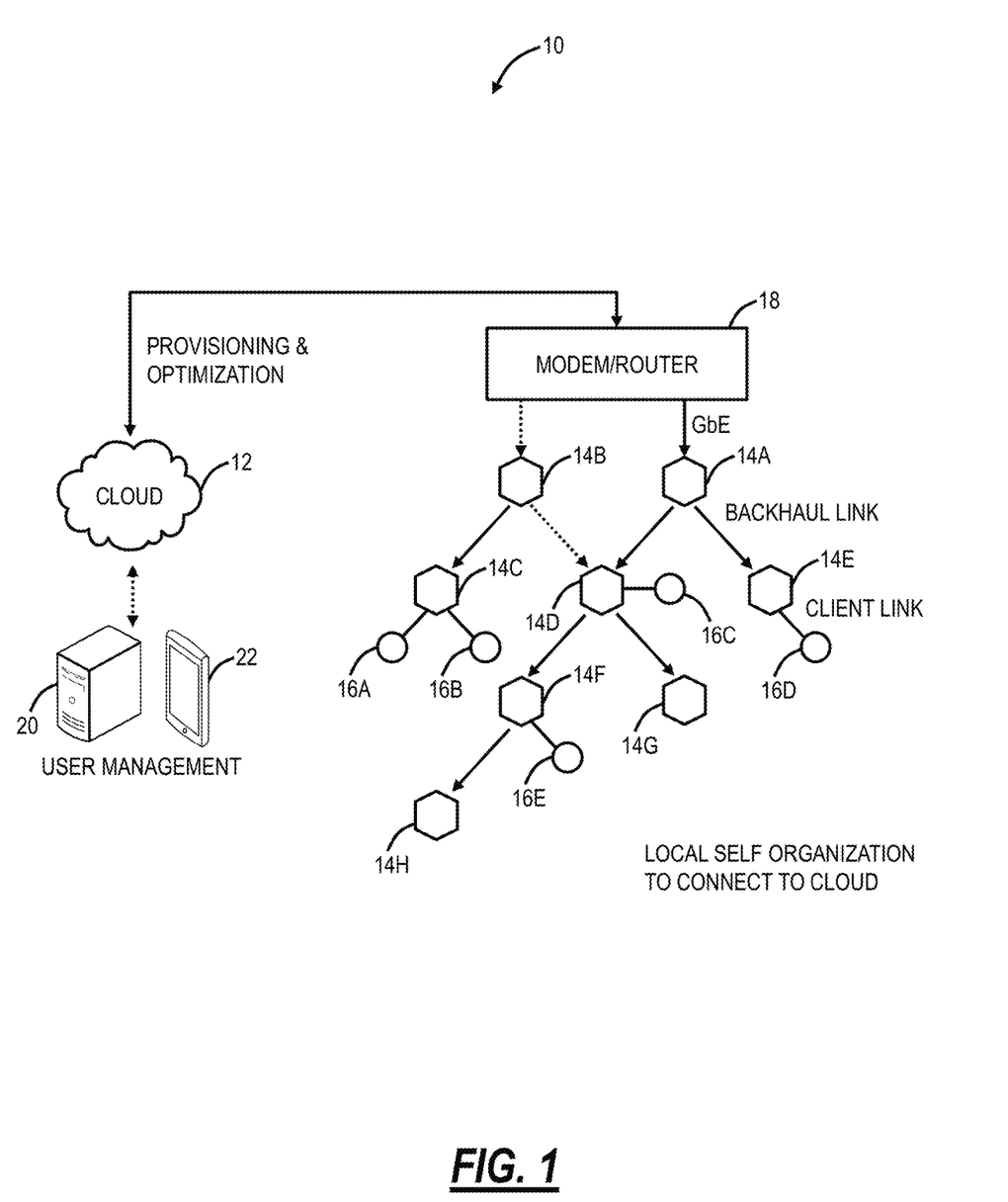
FIG. 1 is a network diagram of a Wi-Fi system with cloud-based control.

FIG. 1 is a network diagram of a Wi-Fi system 10 with cloud-based 12 control. The Wi-Fi system 10 can operate in accordance with the IEEE 802.11 protocols and variations thereof. The Wi-Fi system 10 includes a one or more access points 14 (labeled as access points 14A-14H) which can be distributed throughout a location, such as a residence, office, or the like. As described herein, the Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the Wi-Fi system 10 can include between 1 to 12 access points or more in a home. A large number of access points 14 (which can also be referred to as nodes in the Wi-Fi system 10) ensures that the distance between any access point 14 is always small, as is the distance to any Wi-Fi client device 16 needing Wi-Fi service. That is, an objective of the Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the Wi-Fi system 10 is short and goes through a few walls. This results in very strong signal strengths for each hop in the Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, Internet of Things (IoT) devices, or any network-enabled device. For external network connectivity, one or more of the access points 14 can be connected to a modem/router 18 which can be a cable modem, Digital Subscriber Loop (DSL) modem, or any device providing external network connectivity to the physical location associated with the Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the Wi-Fi system 10, therefore, becomes what is commonly known as a "cloud service." The servers 20 can be a cloud-based controller configured to receive measurement data, to analyze the measurement data, and to configure the access points 14 in the Wi-Fi system 10 based thereon, through the cloud 12. The servers 20 can also be configured to determine which access point 14 each of the Wi-Fi client devices 16 connect (associate) with. That is, in an example aspect, the Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the Wi-Fi system 10, the control and optimization does not require local login to the access point 14, but rather the user device 22 (or a local Wi-Fi client device 16) communicating with the servers 20 in the cloud 12, such as via a disparate network (a different network than the Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the Wi-Fi system 10, only a small subset of the access points 14 require direct connectivity to the modem/router 18 with the non-connected access points 14 communicating with the modem/router 18 through the backhaul links back to the connected access points 14.

Wi-Fi System Compared to Conventional Wi-Fi Systems

Figure 2:
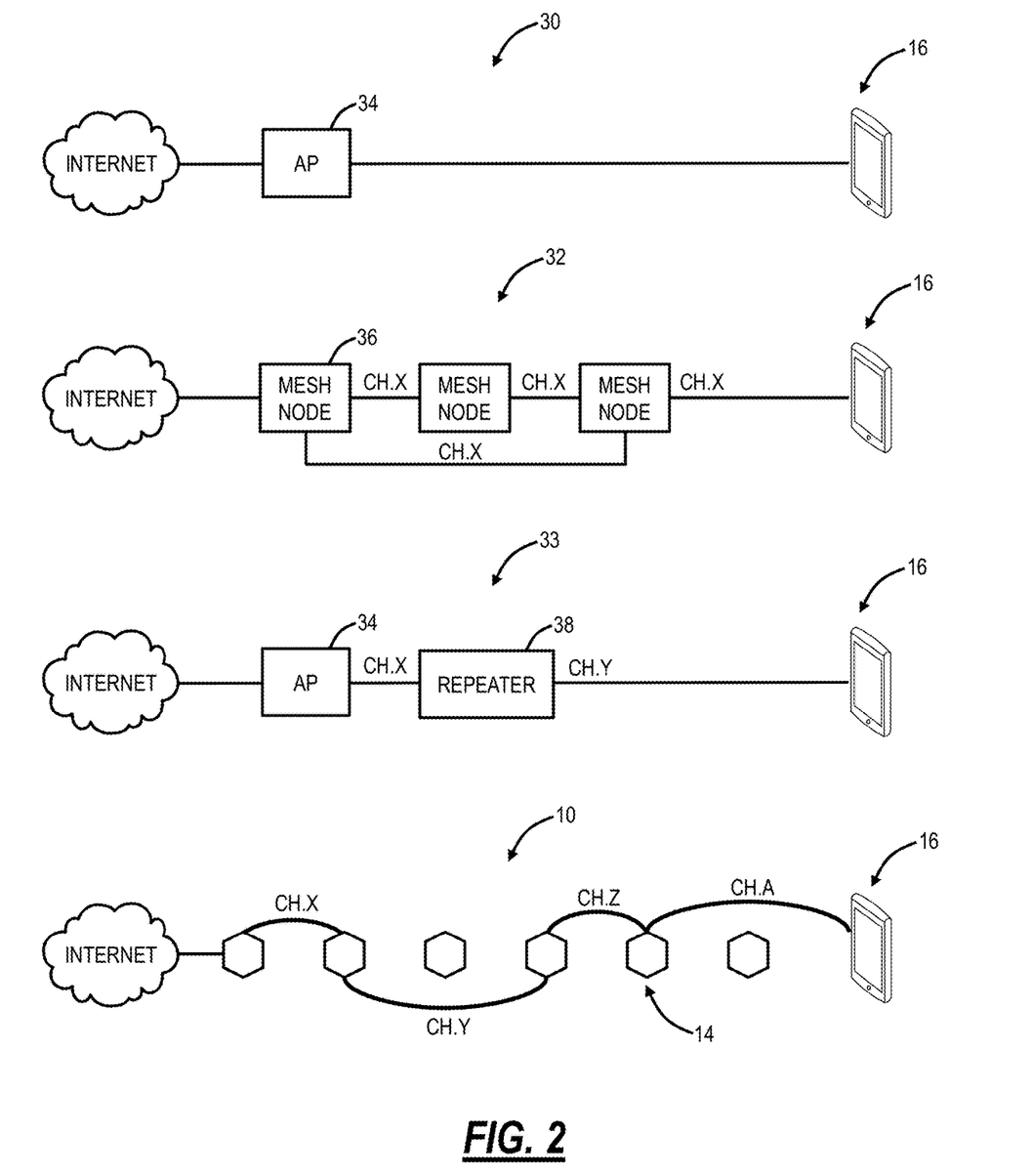
FIG. 2 is a network diagram of differences in the operation of the Wi-Fi system of FIG. 1 relative to a conventional single access point system, a Wi-Fi mesh network, and a Wi-Fi repeater system.

FIG. 2 is a network diagram of differences in the operation of the Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The Wi-Fi system 10 solves the problem with the Wi-Fi mesh network 32 of requiring the same channel for all connections by using a different channel or band for the various hops (note, some hops may use the same channel/ band, but it is not required), to prevent slowing down the Wi-Fi speed. For example, the Wi-Fi system 10 can use different channels/bands between access points 14 and between the Wi-Fi client device 16 (e.g., Ch. X, Y, Z, A), and, also, the Wi-Fi system 10 does not necessarily use every access point 14, based on configuration and optimization by the cloud 12. The Wi-Fi system 10 solves the problems of the single access point system 30 by providing multiple access points 14. The Wi-Fi system 10 is not constrained to a star topology as in the Wi-Fi repeater network 33 which at most allows two wireless hops between the Wi-Fi client device 16 and a gateway. Also, the Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi system 10. By selecting different Wi-Fi channels between the access points 14, interference and congestion are avoided. The server 20 through the cloud 12 automatically configures the access points 14 in an optimized channel hop solution. The Wi-Fi system 10 can choose routes and channels to support the ever-changing needs of consumers and their Wi-Fi client devices 16. The Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an embodiment, the servers 20 in the cloud 12 are configured to optimize channel selection for the best user experience.

Of note, the systems and methods described herein contemplate operation through any of the Wi-Fi system 10, the single access point system 30, the Wi-Fi mesh network 32, and the Wi-Fi repeater network 33. There are certain aspects of the systems and methods which require multiple device Wi-Fi networks, such as the Wi-Fi system 10, the Wi-Fi mesh network 32, and the Wi-Fi repeater network.

Access Point

Figure 3:
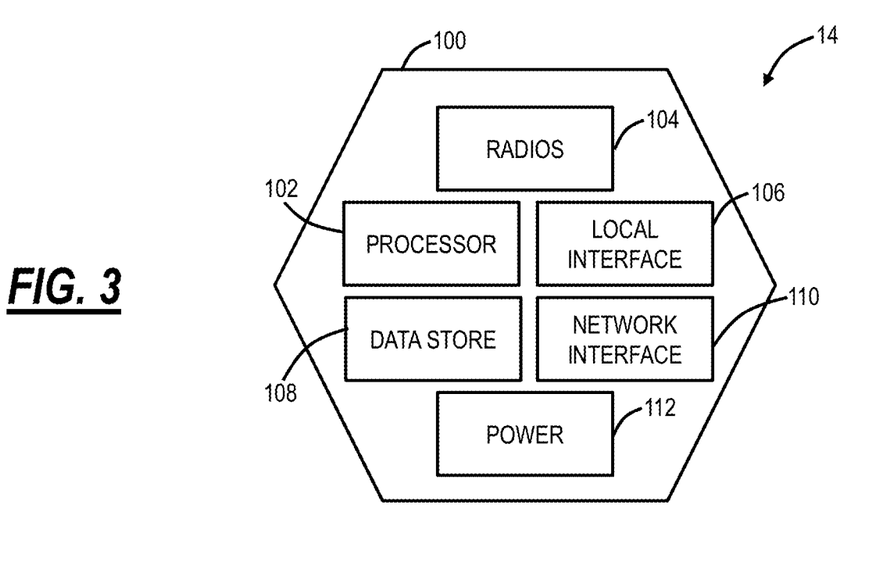
FIG. 3 is a block diagram of functional components of the access point in the Wi-Fi system of FIG. 1 or the other Wi-Fi networks in FIG. 2.

FIG. 3 is a block diagram of functional components of the access point 14 in the Wi-Fi system 10, the single access point system 30, the Wi-Fi mesh network 32, and the Wi-Fi repeater network 33. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the Wi-Fi system 10. The radios 104 can operate according to the IEEE 802.11 standard. The radios 104 include address, control, and/or data connections to enable appropriate communications on the Wi-Fi system 10. As described herein, the access point 14 includes a plurality of radios to support different links, i.e., backhaul links and client links. The radios 104 can also include Wi-Fi chipsets configured to perform IEEE 802.11 operations. In an embodiment, an optimization can determine the configuration of the radios 104 such as bandwidth, channels, topology, etc. In an embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an embodiment, all of the access points 14 in the Wi-Fi system 10 include the network interface 110. In another embodiment, select access points 14, which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
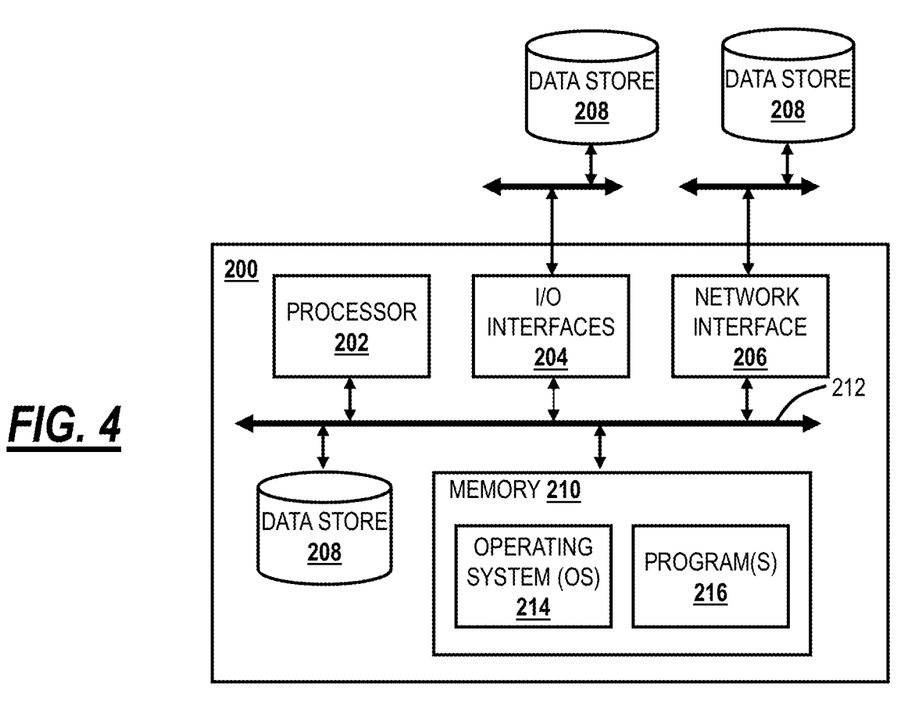
FIG. 4 is a block diagram of functional components of a server, a Wi-Fi client device, or a user device which may be used with the Wi-Fi system of FIG. 1 or the other Wi-Fi networks in FIG. 2.

FIG. 4 is a block diagram of functional components of the server 20, the Wi-Fi client device 16, or the user device 22, which may be used with the Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

Configuration and Optimization Process for the Distributed Wi-Fi System

Figure 5:
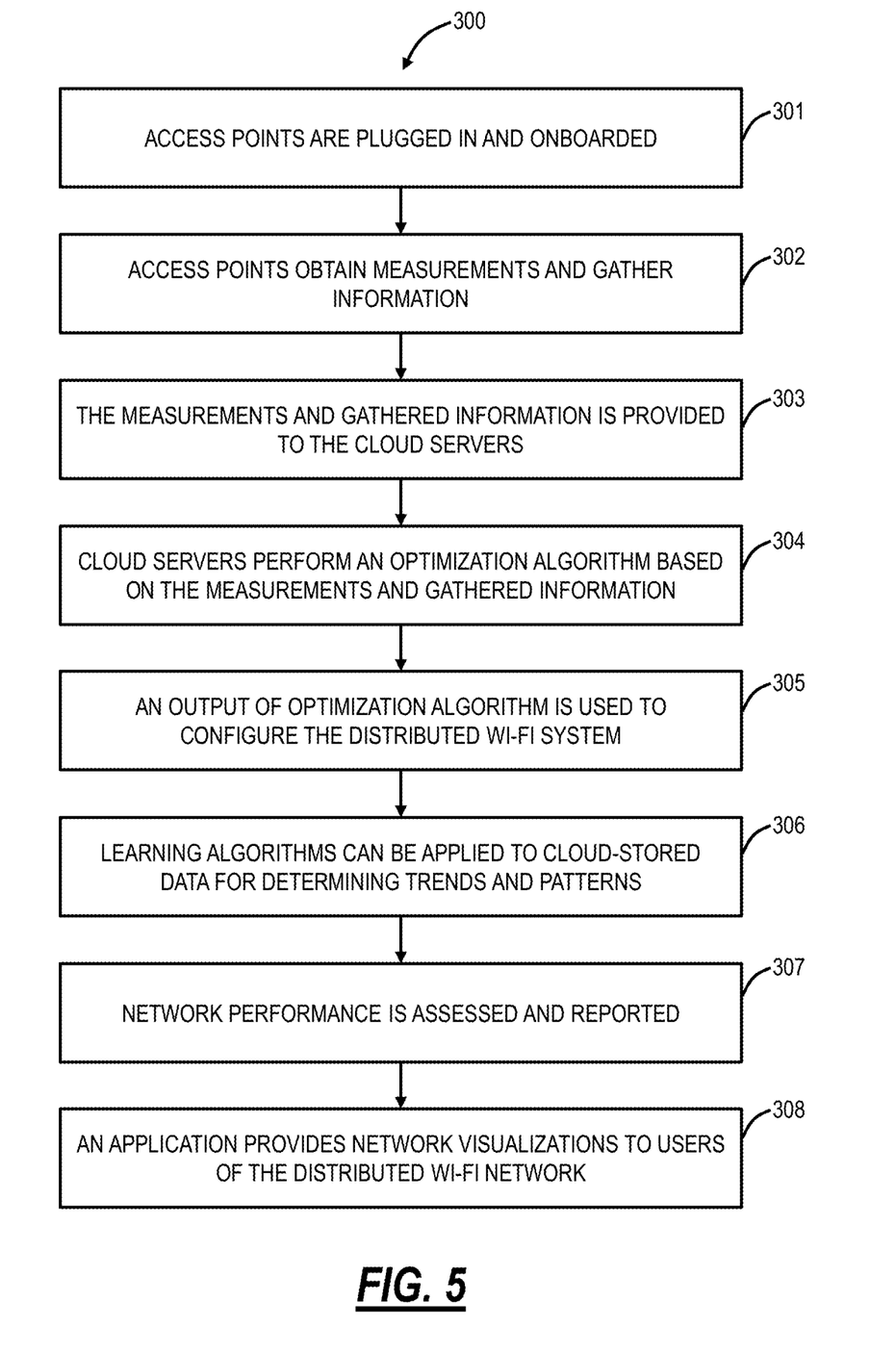
FIG. 5 is a flowchart of a configuration and optimization process 300 for the Wi-Fi system of FIG. 1.

FIG. 5 is a flowchart of a configuration and optimization process 300 for the Wi-Fi system 10. Specifically, the configuration and optimization process 300 includes various steps 301-308 to enable efficient operation of the Wi-Fi system 10. These steps 301-308 may be performed in a different order, in a subset where not all steps are performed and may be repeated on an ongoing basis, allowing the Wi-Fi system 10 to adapt to changing conditions. First, each of the access points 14 are plugged in and onboarded (step 301). In the Wi-Fi system 100, only a subset of the access points 14 are wired to the modem/router 18 (or optionally with a wireless connection to the modem/router 18), and those access points 14 without wired connectivity have to be onboarded to connect to the cloud 12. The onboarding step 301 ensures a newly installed access point 14 connects to the Wi-Fi system 10 so that the access point 14 can receive commands and provide data to the servers 20. The onboarding step 301 can include configuring the access point with the correct Service Set Identifier (SSID) (network ID) and associated security keys. In an embodiment, the onboarding step 301 is performed with Bluetooth or equivalent connectivity between the access point 14 and a user device 22, allowing a user to provide the SSID, security keys, etc. Once onboarded, the access point 14 can initiate communication over the Wi-Fi system 10 to the servers 20 for configuration.

Second, the access points 14 obtain measurements and gather information to enable optimization of the networking settings (step 302). The information gathered can include signal strengths and supportable data rates between all nodes as well as between all nodes and all Wi-Fi client devices 16. Specifically, the measurement step 302 is performed by each access point 14 to gather data. Various additional measurements can be performed, such as measuring an amount of interference, loads (throughputs) required by different applications operating over the distributed Wi-Fi system 10, etc. Third, the measurements and gathered information from the measurement step 302 is provided to the servers 20 in the cloud 12 (step 303). The steps 301-303 are performed on location at the Wi-Fi system 10. Of note, the QoE measurements described herein are contemplated in these steps.

These measurements in steps 302, 303 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore, their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the Wi-Fi system 10 (step 304). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function, which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the Wi-Fi system 10 (step 305). The nodes and client devices need to be configured from the cloud based on the output of the optimization. Specific techniques are used to make the configuration fast, and to minimize the disruption to a network that is already operating. The outputs of the optimization are the operational parameters for the Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the Wi-Fi system 10. The optimization tries to use the lowest possible channel bandwidth for each link that will support the load required by the various user's applications. By using the narrowest sufficient throughput channels, the maximum number of non-interfering channels are left over for other links within the Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the Wi-Fi system 10, meaning which nodes connect to which other nodes. The actual route through the Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 306). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 307). Eighth, an application (such as a mobile app operating on the user device 22) can provide user visibility into the network operation (step 308). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 300 is described herein with reference to the Wi-Fi system 10 as an example embodiment. Those skilled in the art will recognize the configuration and optimization process 300 can operate with any type of multiple node Wi-Fi system, including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization.

Optimization

Figure 6:
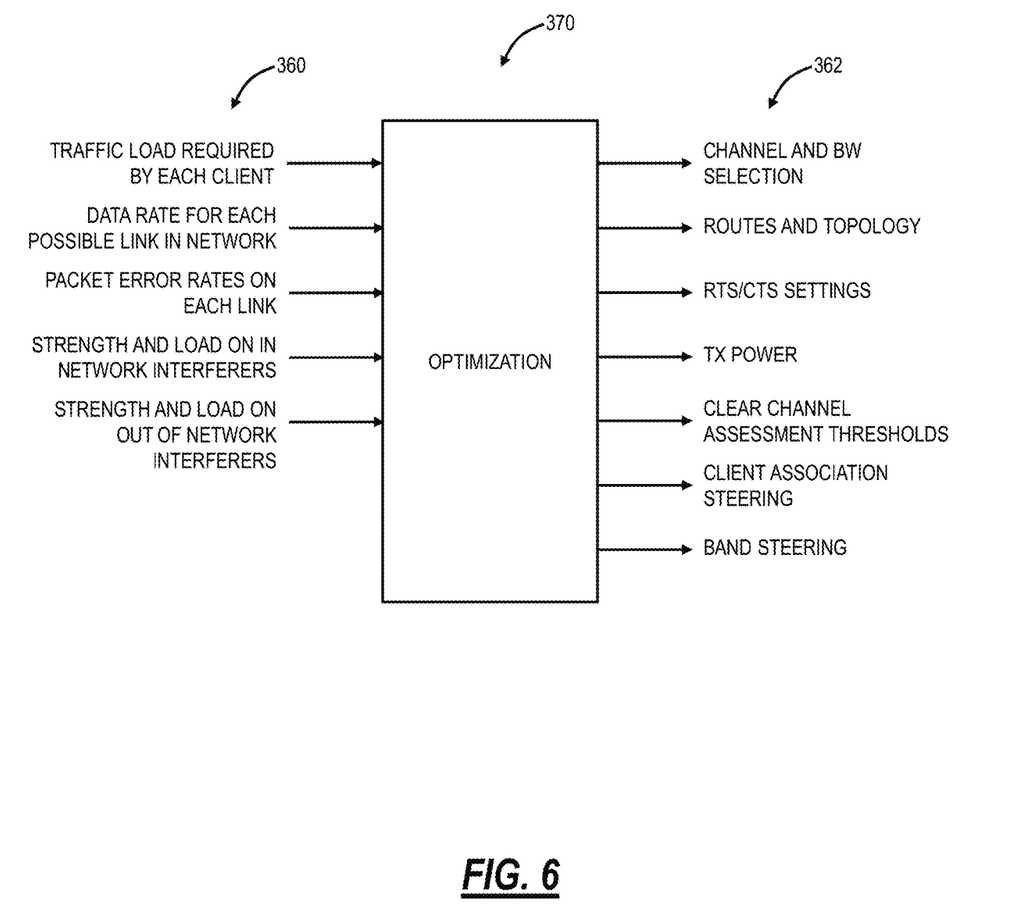
FIG. 6 is a block diagram of inputs and outputs to an optimization.

FIG. 6 is a block diagram of inputs 360 and outputs 362 to an optimization 370. The inputs 360 can include, for example, traffic load required by each client, signal strengths between nodes and between access points 14 (nodes) and Wi-Fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 370. The outputs 362 of the optimization 370 include, for example, channel and bandwidth (BW) selection, routes and topology, Request to Send/Clear to Send (RTS/CTS) settings, Transmitter (TX) power, clear channel assessment thresholds, client association steering, and band steering.

QoE Measurements

In various embodiments, the present disclosure includes various techniques to determine QoE measurements for the Wi-Fi client devices 16 and/or the access points 14, i.e., any device operating in the Wi-Fi system 10, the single access point system 30, the Wi-Fi mesh network 32, and the Wi-Fi repeater network 33. The QoE measurements are metrics that can be used in the configuration and optimization process 300 and/or the optimization 370. The QoE measurements are readily available, determined in real-time and historical, take into account device needs, etc.

Along with being used in the configuration and optimization process, the QoE measurements can be used for client steering. In client steering, the controller or access points guide or control a given client device to connect to a particular access point. This best access point depends on the location of the client, the amount of other traffic in the network, the amount of interference, and other factors related to the conditions of the Wi-Fi network. The goal in steering the client device is to provide the client with the best QoE possible. Which AP will provide the client the best QoE can better be determined if the QoE values of each of the APs are known. In addition, historical QoE values for the client, when it has been connected to different APs at different signal levels, can also be an excellent indicator of where it will receive the best service.

The QoE measurements may also be used in indications to the end user, or to the network operator. These indications can be used to determine the health of the network, or draw attention to networks that are not operating well. The QoE measurements can be formed for client devices in the network, or for access points in the network. When formed for access points, the QoE metric becomes an indicator of how well the AP is connected into the rest of the network, and the quality of experience that a client that connects to that AP is likely to get.

QoE Measurement Based on Possible Throughput

A QoE measurement based on possible throughput is a metric of the throughput a given Wi-Fi client device 16 or access point 14 could achieve, if it were to transfer (transmit or receive) data as quickly as is possible given the current conditions in the network. This measurement is described herein as the "possible throughput." The possible throughput factors an entire path through a multi-hop network such as the Wi-Fi system 10, the Wi-Fi mesh network 32, and the Wi-Fi repeater network 33. The possible throughput also factors interference from neighbors, congestion (self-interference) from other hops or parts of the network, packet error or retry rates at each hop, etc. Further, the possible throughput factors the access point 14 and the Wi-Fi client device 16 capabilities such as MIMO dimension, bandwidth, Modulation and Coding Scheme (MCS), etc. Signal strength can be used to estimate the physical (PHY) achievable on each hop. Also, the actual previously observed PHY rates can be used to determine the possible throughput. Any PHY rate can be translated to an effective throughput rate.

QoE Measurement Based on "Happy" Throughput

A QoE measurement based on "happy" throughput is a metric of the throughput a given Wi-Fi client device 16 or access point 14 needs based on the type of device. This measurement is described herein as the "happy" or needed throughput. The needed throughput factors the type of device and the throughput needed for applications that typically run on that type of device. For example, a media streaming device at 4 k may need from 5-25 Mb/s, whereas an IoT device may need 10s or 100s of kb/s. The needed throughput can factor the historically observed data consumption (either Tx or Rx), the current consumption of the device, and the Internet access speed of the modem/router 18 (e.g., by running a throughput test).

QoE Measurement Based on a Ratio

A QoE measurement can be based on a ratio of the possible throughput and the needed throughput. This ratio can be based on different versions of the happy throughput, for example, one factoring current throughput, and one not factoring current throughput. This measurement can be quantized on a scale for a health score. Quantization thresholds can be arranged in a non-linear way, or ratio is calculated in a non-linear way. Also, the quantization can factor additional items such as disconnect/re-connect events and "double factors" a parameter, such as interference—interference lowers the possible throughput, but it also is unreliable, so penalize the QoE a second time for the unreliability in addition to the effect on throughput. Also, a QoE measurement can be based partially on the number of disconnect/re-connect events. It may be advantageous for the QoE based score or associated health score to be communicated as a coarsely quantized value. For example, a simple integer value ranging from 1 to 5. This is simpler for the user, and specific behaviors or perceived quality can be assigned to each of the integer scores.

Real-Time Computation

The QoE measurement can be calculated for access points 14 as well as Wi-Fi client devices 16. The QoE measurement can be calculated in real or near real time such that the situation in a home can be viewed "live." Also, the live mode can be selectively enabled, such as when a user is in need of such data, e.g., troubleshooting a problem through an app, etc. The live mode can include storing longer time samples (e.g., 15 minutes). Also, the data in the live mode can have a set Time to Live (TTL) such that the data is deleted when no longer needed. Or the data can be deleted as soon as the app or troubleshooting is complete.

The QoE measurements can also be stored and analyzed offline to identify statistics and devices/homes that have problems. Also, if a Wi-Fi client device 16 is connected in the network in more than one way during a single recorded time period, the statistics include information regarding the behavior while connected in all ways, and the amount of time spent connected all the ways.

The QoE measurements are used to create alarms or alerts, such as based on a fraction of time spent in different QoE levels, in which different time fractions are specified for the ratios calculated with different ingredients in the needed throughput, in which the QoE score is displayed to both a user via a phone app, and to a customer agent via a web dashboard.

QoE Measurement Process

The QoE measurement can be determined for downstream performance only, i.e., from the access point 14A connected to the modem/router 18 to the Wi-Fi client device 16, including through any intermediate access points 14. This downstream constraint is valid since upstream bandwidth is rarely an issue. Further, poor performance in the upstream direction almost certainly indicates poor downstream QoE as well.

The QoE measurement can be a QoE score based on the QoE ratio of the real-time estimated throughput possible, to the needed throughput QoE ratio=real-time estimated throughput possible/needed throughput Needed throughput=min(current usage, broadband throughput, device type needed throughput, statistically determined usage per device)

The current usage can be a historical measurement based on a given time period, e.g., bytes received in a minute. The current usage can be obtained from each access point 14 or Wi-Fi client device 16.

The broadband throughput is a determination of the bandwidth to the modem/router 18 and can be based on a speed test. If no speed test is available, the broadband throughput can be an estimate by looking at the total bytes sent to all Wi-Fi client devices 16 by all access points 14 across a time period (e.g., one minute) (using the QoE data) and record the maximum value. Alternatively, the broadband throughput can be an assumption. For example, assume the modem/router 18 access is 100 Mb/s and if all device types need throughputs of 50 Mb/s or less, it is possible to assume the broadband throughput is 50 Mb/s. Further, the broadband throughput can be based on who the carrier is (providing access to the modem/router 18).

The device type needed throughput can be a fixed value, predetermined, per device type. Device types can be determined from a variety of approaches, such as via Media Access Control (MAC) address. For example, a laptop would have a value, a streaming device would have a value, an IoT device such as a thermostat would have a value, etc.

The statistically determine usage per device can be measured for each device, such as based on MAC address. This usage value can be determined for a particular device from its history of usage. For example, this can be a high percentile based measurement—determine the "highest" level of throughput that the device has ever needed.

In another embodiment, the needed throughput can be equal to min(broadband throughput, device type needed throughput), which does not factor the current usage.

Figure 7:
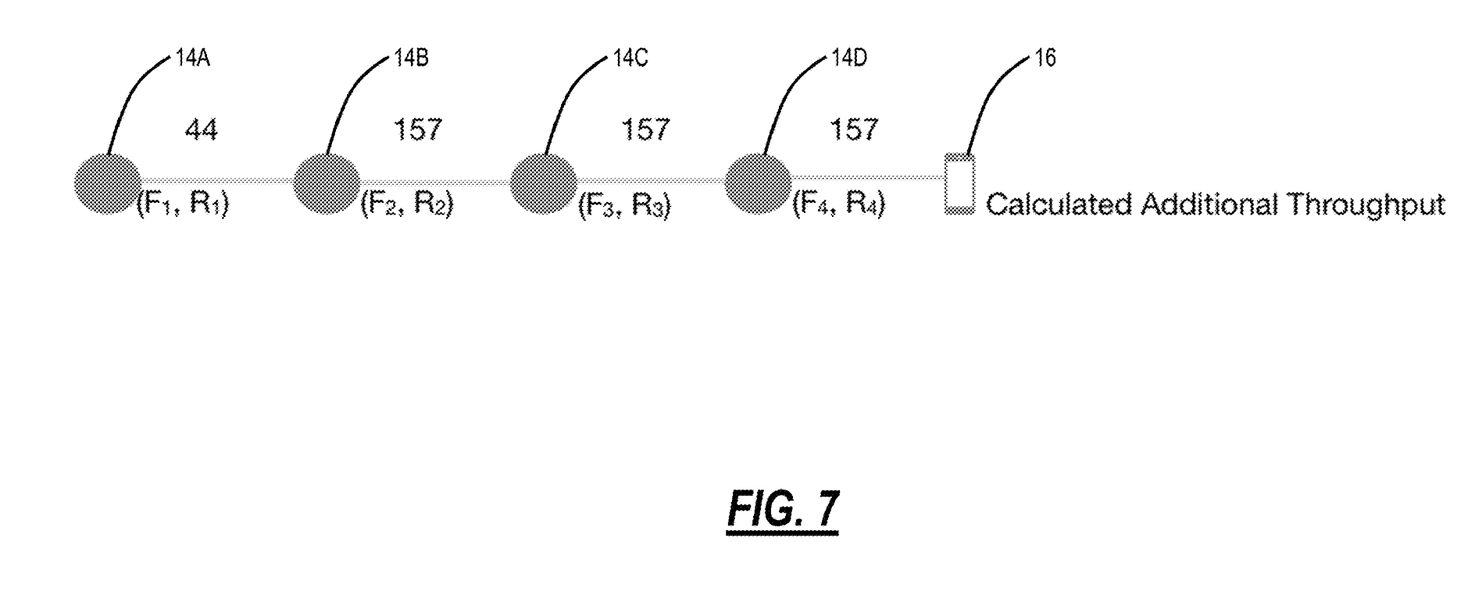
FIG. 7 is a network diagram illustrating computation of the calculated additional throughput in an example of four access points with four total hops to the Wi-Fi client device.

The possible throughput can be determined in real-time as follows:

Possible throughput=actual throughput (current usage estimate) at the device+calculated additional throughput the device could get The calculated additional throughput can be estimated. FIG. 7 is a network diagram illustrating computation of the calculated additional throughput in an example of four access points 14A, 14B, 14C, 14D with four total hops to the Wi-Fi client device 16. Each hop has an amount of free airtime (F) available to transmit, and a rate at which that hop can operate (R). Assume the first hop is on its own frequency channel (e.g., ch. 44 in this example), but the three remaining hops are on the same frequency channel (e.g., ch. 157 in this example). Then the net throughput would be calculated as:

Calculated Additional Throughput=

$$\min(F_1 * R_1, \min(F_2, F_3, F_4) * \frac{1}{\left(\frac{1}{R_2} + \frac{1}{R_3} + \frac{1}{R_4}\right)}$$

$$F = (1 - \text{utilization})$$

where utilization accounts or neighbor interference, congestion in the network, and self Tx/Rx. Utilization and other metrics are expressed as a fraction (or decimal value of 0 to 1). R is the adjusted rates factoring Packet Reception Rates (PRR) for each link, namely:

$$R = \text{PHY rate} * (1 - \text{PRR})$$

Of course, other configurations are contemplated, namely different numbers of hops, same or different channels, etc.

and one of ordinary skill in the art will appreciate the calculated additional throughput "CT" formula above is adjusted accordingly. Generally, the calculated additional throughput "CT" is the minimum free airtime (F)*rate at which that hop can operate (R).

The calculated additional throughput "CT" can be calculated every minute in a data pipeline. Again, the time period can be different than a minute in other embodiments. To estimate QoE using the calculated additional throughput, statistics can be determined over a data period (e.g., 15 minutes), such as weighted CT per device/client—weighted average over the active 1-min samples, and average CT per device/client—average over all the 1-min samples.

The current usage can be calculated every minute in a data pipeline. Again, the time period can be different than a minute in other embodiments. The following statistics (e.g., over 15-min) are needed to estimate QoE, namely total traffic transmitted and received per device (or access point) in a given time interval (total_bytes_tx/total_bytes_rx per device/client), and a number of active periods within a report duration (numActiveMinutes per device/client). Both of these values are already available in a given Wi-Fi chipset. The total_bytes_tx/total_bytes_rx per device/client provides the total bytes transmitted and received over the report duration (e.g., 15-min). The numActiveMinutes per device/client includes a number of active periods (e.g., 1-min) within the report duration. This value can be extrapolated from "client_phy_rate_stats.busyRatio."

Other QoE Aspects

The QoE ratio of possible throughput to needed throughput may fluctuate for each access point 14 and Wi-Fi client device 16 as activity changes. PHY or PRR rate goes up or down for any reason (location/distance to an access point 14 or other access points 14 change). Also, interference/congestion varies over time. A time graph of the QoE ratio will illustrate raw results and will be highly dynamic. A user interface may display these values over time, e.g., past hour, day, week, month, etc.

Other factors could be incorporated into the QoE score. In particular, the QoE experienced by an end user can be seriously degraded if the client device or AP along the path to which the client is connected disconnect temporarily from the network. Such disconnections can be observed and counted. Clients or APs that have frequent disconnections can have their QoE score adjusted downward to reflect that negative affect on the quality that a consumer would experience under those circumstances. The disconnection frequency can be calculated as the ratio of the number of disconnects per unit time, but counting disconnects over a known period of time and finding the ratio. A higher ratio indicates a more severe degradation of quality. Such a value can be smoothed, averaged, or windowed as known in the art.

Health Score

To make the QoE measurements more user-friendly, e.g., to enable user actions such as moving access points 14, adding access points 14, etc., the QoE measurements can be mapped to a so-called health score.

QoE Live Mode

The QoE measurements can be determined/displayed in a live mode for real-time insights. The live mode is a feature where an authorized user can notify a real-time insights service to publish the QoE state for each access point 14 and each Wi-Fi client device 16 in a given location. The use case can be a live chart on the cloud-based controller for a support person to perform live debugging. The real-time insights service can accept the live mode request through a POST endpoint and start publishing to a Kafka topic with the location Id as the key, followed by which the stream will read the data from Kafka and persist to a database for the charts to leverage it.

QoE 15 Minute Persistence

The live mode/real-time insights service can provide data for 15-minute data persistence for QoE. The 15-minute persistence allows the QoE data to be analyzed over a longer period of time than the live mode can support. This data would be present for all the links in a given location at all time.

The use case for this data is largely for offline analysis and support, to identify the customer experience pain points, it was useful to store the minimum of each one of the above metrics per client device per 15 minutes to understand in retrospection what the worst minute of experience was for the customer.

QoE Process

Figure 8:
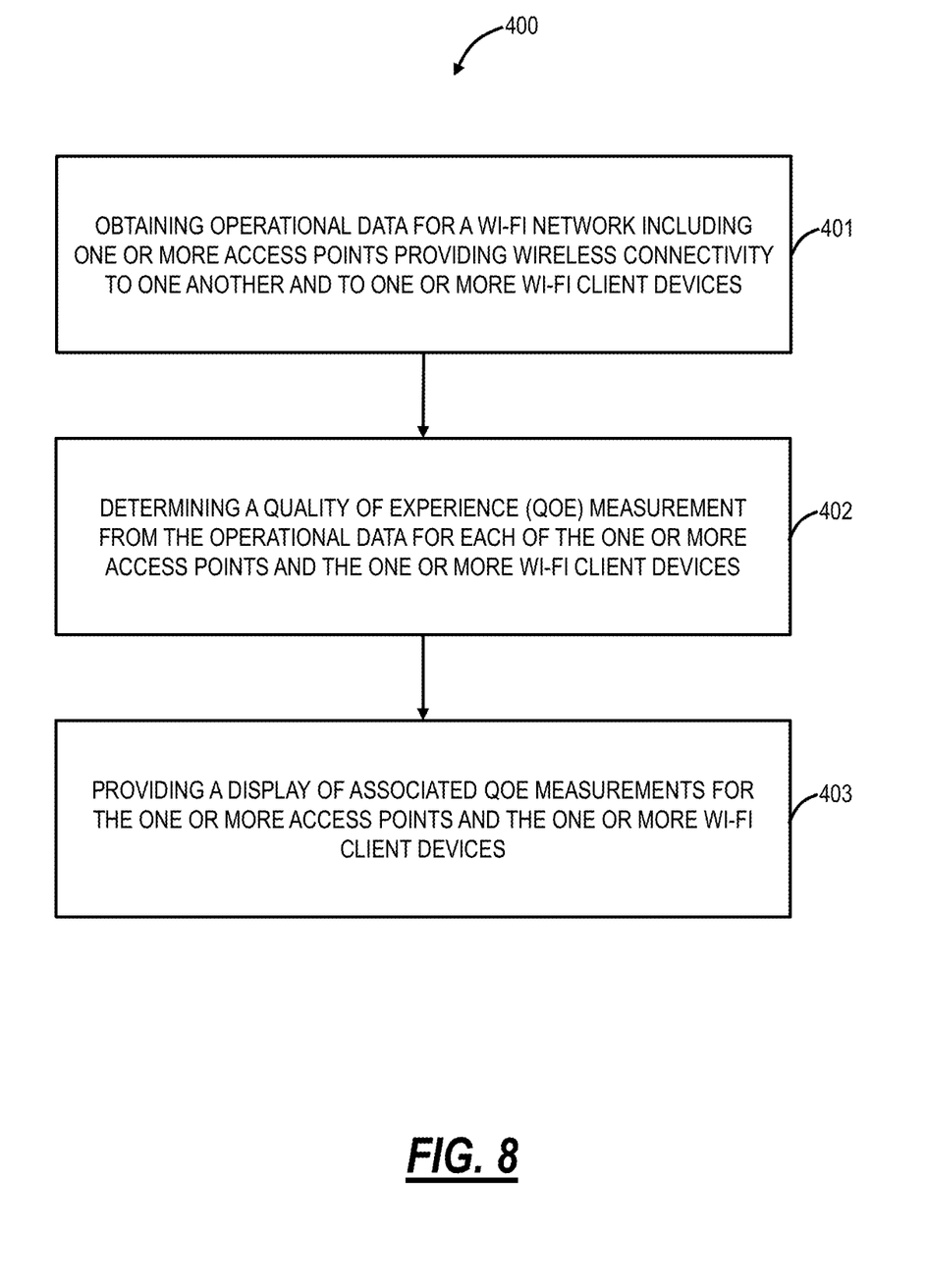
FIG. 8 is a flowchart of a QoE measurement process.

FIG. 8 is a flowchart of a QoE measurement process 400. The process 400 includes obtaining operational data for a Wi-Fi network including one or more access points providing wireless connectivity to one another and to one or more Wi-Fi client devices (step 401); determining a Quality of Experience (QoE) measurement from the operational data for each of the one or more access points and the one or more Wi-Fi client devices (step 402); and providing a display of associated QoE measurements for the one or more access points and the one or more Wi-Fi client devices (step 403).

The process 400 can further include providing the display in real-time or near real-time to troubleshoot or debug operations of the Wi-Fi network. The process 400 can further include providing the display in a historical graph to identify problems over time in the Wi-Fi network. The process 400 can further include providing an alarm or an alert responsive to any device having a QoE measurement at or below a threshold.

The QoE measurement can be based in part on a possible throughput of a device that incorporates all factors in the Wi-Fi network. The possible throughput can be determined based on a current usage estimate at the device and additional throughput the device could get based on hops in the Wi-Fi network, physical (PHY) rate, and Packet Retry Rate (PRR). The QoE measurement can be based in part on a needed throughput of a device that incorporates how much the device needs given its device type, history, and overall Internet access speed. The needed throughput can be determined based on a minimum of any of current usage, the overall Internet access speed, and a device type needed throughput.

The QoE measurement can be based on a possible throughput of a device that incorporates all factors in the Wi-Fi network, a needed throughput of a device that incorporates how much the device needs given its device type, history, and overall Internet access speed, and a ratio thereof. The operational data can be obtained from a Wi-Fi chipset.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform the steps of:
obtaining operational data for a Wi-Fi network including one or more access points providing wireless connectivity to one another and to one or more Wi-Fi client devices, wherein the operational data includes 1) total traffic transmitted and received in given time intervals, and 2) active periods within the given time intervals, each provided for devices including any of the one or more access points and the one or more Wi-Fi client devices, and wherein the operational data is obtained from a Wi-Fi chipset available therein;
determining a Quality of Experience (QoE) measurement from the operational data for one or more access points or Wi-Fi client devices; and
providing a display of associated QoE measurements for one or more access points or one or more Wi-Fi client devices.

2. The non-transitory computer-readable medium of claim 1, wherein the instructions that, when executed, further cause the processor to perform the steps of providing the display in real-time or near real-time to troubleshoot or debug operations of the Wi-Fi network.

3. The non-transitory computer-readable medium of claim 2, wherein the real time display is enabled only when a consumer or operator is looking at a display that require real time data.

4. The non-transitory computer-readable medium of claim 1, wherein the instructions that, when executed, further cause the processor to perform the steps of providing the display in a historical graph to identify problems over time in the Wi-Fi network.

5. The non-transitory computer-readable medium of claim 1, wherein the instructions that, when executed, further cause the processor to perform the steps of providing an alarm or an alert responsive to any device having a QoE measurement at or below a threshold.

6. The non-transitory computer-readable medium of claim 1, wherein the QoE measurement is based in part on a possible throughput of a device that incorporates factors in the Wi-Fi network.

7. The non-transitory computer-readable medium of claim 6, wherein the possible throughput is based upon previously observed PHY rates.

8. The non-transitory computer-readable medium of claim 1, wherein the QoE measurement is based in part on a needed throughput of a device that incorporates how much the device needs given one or more of its device type, history, and current data usage.

9. The non-transitory computer-readable medium of claim 8, wherein the needed throughput is capped by the overall Internet access speed.

10. The non-transitory computer-readable medium of claim 1, wherein the QoE measurement is based on
a possible throughput of a device that incorporates factors in the Wi-Fi network,
a needed throughput of a device that incorporates how much the device needs given one or more of its device type, history, current data usage, and overall Internet access speed, and
a ratio thereof.

11. The non-transitory computer-readable medium of claim 1, wherein the QoE measurement factors the number of disconnect or reconnect events.

12. The non-transitory computer-readable medium of claim 1, wherein the QoE measurement is used to guide the optimization or configuration of the Wi-Fi network.

13. The non-transitory computer-readable medium of claim 1, wherein the QoE measurement is used to guide the client steering implemented in the Wi-Fi network.

14. The non-transitory computer-readable medium of claim 1, wherein the QoE measurement factors the effect of all hops in a multi-hop network.

15. The non-transitory computer-readable medium of claim 14, wherein the effect of all hops includes the effect of self interference between hops.

16. The non-transitory computer-readable medium of claim 1, wherein the QoE measurement is expressed as a coarsely quantized score.

17. An apparatus comprising:
a processor; and
memory storing instructions that, when executed, cause the processor to
obtain operational data for a Wi-Fi network including one or more access points providing wireless connectivity to one another and to one or more Wi-Fi client devices, wherein the operational data includes 1) total traffic transmitted and received in given time intervals, and 2) active periods within the given time intervals, each provided for devices including any of the one or more access points and the one or more Wi-Fi client devices, and wherein the operational data is obtained from a Wi-Fi chipset available therein;

determine a Quality of Experience (QoE) measurement from the operational data for each of the one or more access points and the one or more Wi-Fi client devices; and provide a display of associated QoE measurements for the one or more access points and the one or more Wi-Fi client devices.

18. The apparatus of claim 17, wherein the instructions that, when executed, further cause the processor to provide the display in real-time or near real-time to troubleshoot or debug operations of the Wi-Fi network.

19. The apparatus of claim 17, wherein the instructions that, when executed, further cause the processor to provide the display in a historical graph to identify problems over time in the Wi-Fi network.

20. A method comprising:

obtaining operational data for a Wi-Fi network including one or more access points providing wireless connectivity to one another and to one or more Wi-Fi client devices, wherein the operational data includes 1) total traffic transmitted and received in given time intervals, and 2) active periods within the given time intervals, each provided for devices including any of the one or more access points and the one or more Wi-Fi client devices, and wherein the operational data is obtained from a Wi-Fi chipset available therein;

determining a Quality of Experience (QoE) measurement from the operational data for each of the one or more access points and the one or more Wi-Fi client devices; and providing a display of associated QoE measurements for the one or more access points and the one or more Wi-Fi client devices.

* * * * *